(12) United States Patent
Gao et al.

(10) Patent No.: US 12,277,577 B2
(45) Date of Patent: Apr. 15, 2025

(54) ESTIMATED UNIQUE ENGAGEMENT MEASUREMENT WITH USER PRIVACY PROTECTION

(71) Applicant: Microsoft Technology Licensing, LLC, Redmond, WA (US)

(72) Inventors: Yuan Gao, Santa Clara, CA (US); Mu Qiao, Campbell, CA (US); Min Liu, Palo Alto, CA (US); Yi Zhang, Los Altos, CA (US); Qianqian Ma, Sunnyvale, CA (US); Shan Ba, Palo Alto, CA (US); Lisa Qian, Seattle, WA (US); Ian V. Koeppe, Papillion, NE (US); Chad K. Crowe, Omaha, NE (US); John F. McCarthy, III, Lincoln, NE (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/335,072

(22) Filed: Jun. 14, 2023

(65) Prior Publication Data
US 2024/0420177 A1 Dec. 19, 2024

(51) Int. Cl.
*G06Q 30/02* (2023.01)
*G06Q 30/0241* (2023.01)
*G06Q 30/0242* (2023.01)

(52) U.S. Cl.
CPC ..... *G06Q 30/0246* (2013.01); *G06Q 30/0277* (2013.01)

(58) Field of Classification Search
CPC ........ G06Q 30/0246; G06Q 30/0207–30/0277
See application file for complete search history.

(56) References Cited

U.S. PATENT DOCUMENTS

| | | | |
|---|---|---|---|
| 8,973,023 B1 | 3/2015 | Rao et al. | |
| 9,357,022 B1 * | 5/2016 | Chou | G06Q 50/01 |
| 10,324,960 B1 * | 6/2019 | Skvortsov | G06F 16/955 |
| 10,891,657 B1 * | 1/2021 | Skoe | G06Q 30/02 |
| 11,798,034 B1 * | 10/2023 | Skoe | G06Q 30/0269 |
| 11,816,169 B2 * | 11/2023 | Mantzouratos | G06F 16/2255 |
| 2013/0218678 A1 * | 8/2013 | Benyamin | G06Q 30/0255 |
| | | | 705/14.53 |
| 2014/0089402 A1 * | 3/2014 | Liyanage | G06Q 30/02 |
| | | | 709/204 |

(Continued)

*Primary Examiner* — Thuy N Nguyen
(74) *Attorney, Agent, or Firm* — Nicholson De Vos Webster & Elliott LLP

(57) ABSTRACT

Embodiments of the disclosed technologies are capable of providing engagement feedback for an online system while maintaining user privacy. Embodiments determine one or more user groups. A user group includes users, and a size of the user group is selected to protect user privacy. A user action is received from a user in a first group. The user action includes an interaction with a piece of content. A group action count is updated for the first group based on the user action. The group action count indicates a number of interactions with the piece of content by any of the users in the first group. An estimated number of unique engagements is calculated based on the group action count and the size of the first group. The estimated number of unique engagements is provided to the online system as the engagement feedback for the piece of content.

20 Claims, 12 Drawing Sheets

(56) References Cited

U.S. PATENT DOCUMENTS

| | | | |
|---|---|---|---|
| 2014/0095257 A1* | 4/2014 | Lewis | G06Q 50/01 |
| | | | 705/7.33 |
| 2014/0278308 A1* | 9/2014 | Liu | G06F 16/958 |
| | | | 703/6 |
| 2016/0117736 A1* | 4/2016 | Dasdan | G06Q 30/0269 |
| | | | 705/14.66 |
| 2016/0267520 A1* | 9/2016 | Kalish | G06Q 30/0272 |
| 2016/0307279 A1* | 10/2016 | Liyanage | G06Q 30/02 |
| 2017/0262762 A1* | 9/2017 | Conover | G06F 16/9536 |
| 2017/0345026 A1* | 11/2017 | Iannaccone | G06Q 30/0201 |
| 2018/0150856 A1* | 5/2018 | Zhu | G06Q 30/0204 |
| 2018/0150883 A1* | 5/2018 | Davin | G06Q 30/0269 |
| 2018/0174190 A1* | 6/2018 | Ferreira | G06Q 50/01 |
| 2023/0077948 A1* | 3/2023 | Jackson | G06Q 30/0264 |
| | | | 709/206 |

* cited by examiner

FIG. 1

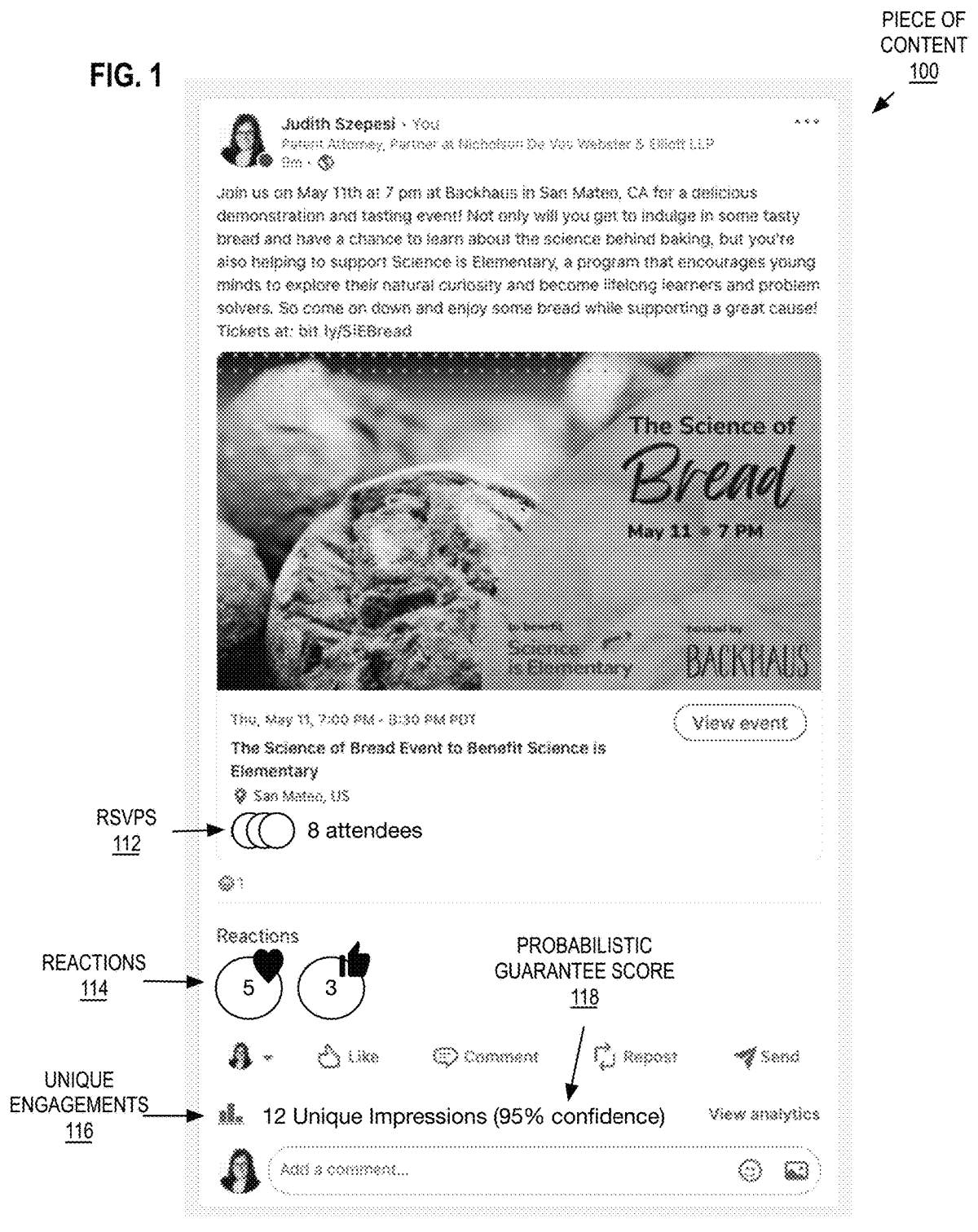

PIECE OF
CONTENT
100

RSVPS
112 → 8 attendees

REACTIONS
114

PROBABILISTIC
GUARANTEE SCORE
118

UNIQUE
ENGAGEMENTS
116 → 12 Unique Impressions (95% confidence)

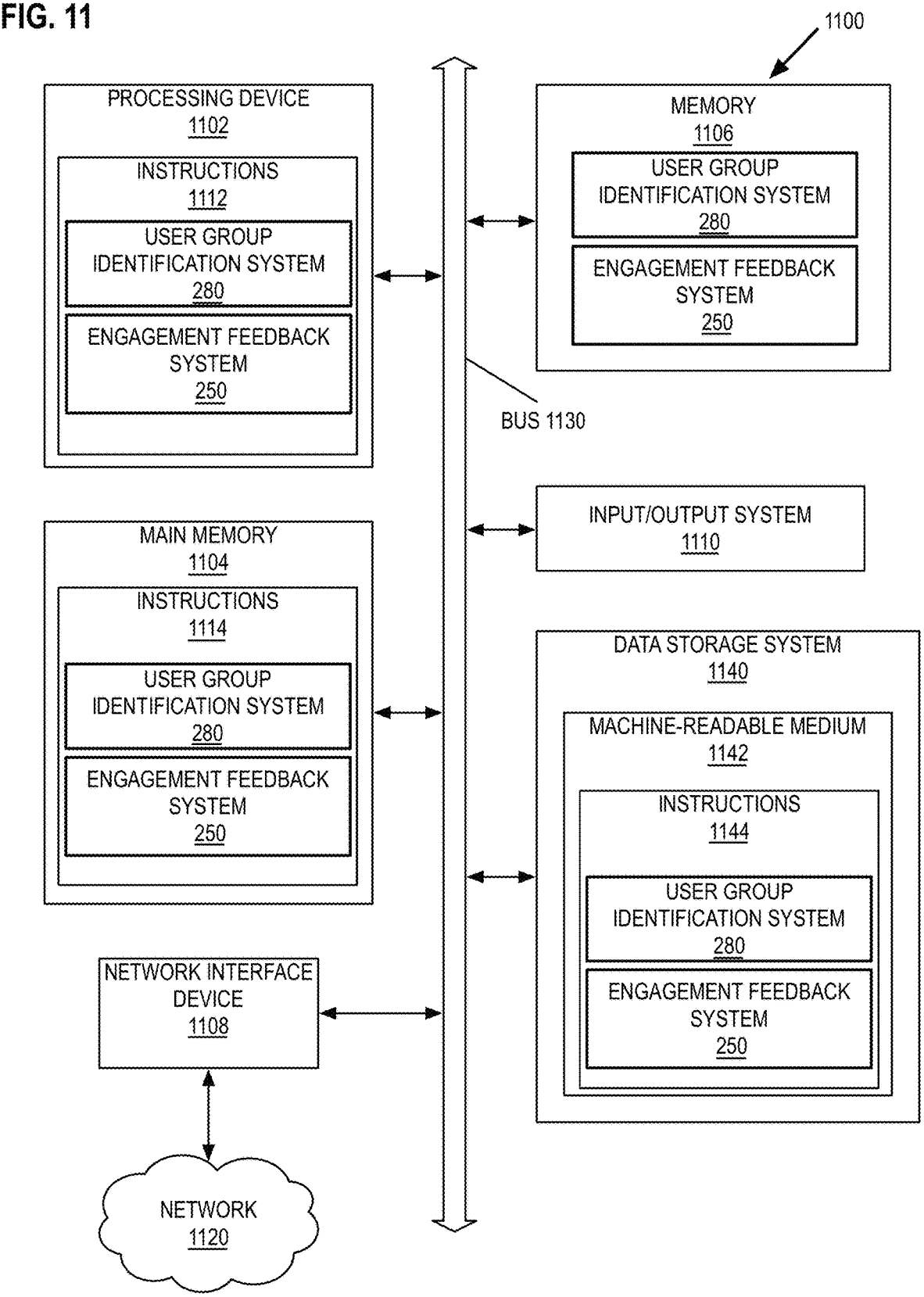

ESTIMATED UNIQUE ENGAGEMENT MEASUREMENT WITH USER PRIVACY PROTECTION

TECHNICAL FIELD

The present disclosure generally relates to engagement tracking, and more specifically, relates to tracking user engagement while protecting user privacy.

BACKGROUND

Software applications commonly track user actions for various reasons, including so that content providers can see the effectiveness of the content they post.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates one embodiment of a user interface including output of an engagement feedback system in accordance with some embodiments of the present disclosure.

FIG. 11 is a block diagram of an example computer system in which embodiments of the present disclosure can operate.

DETAILED DESCRIPTION

Figure 2:
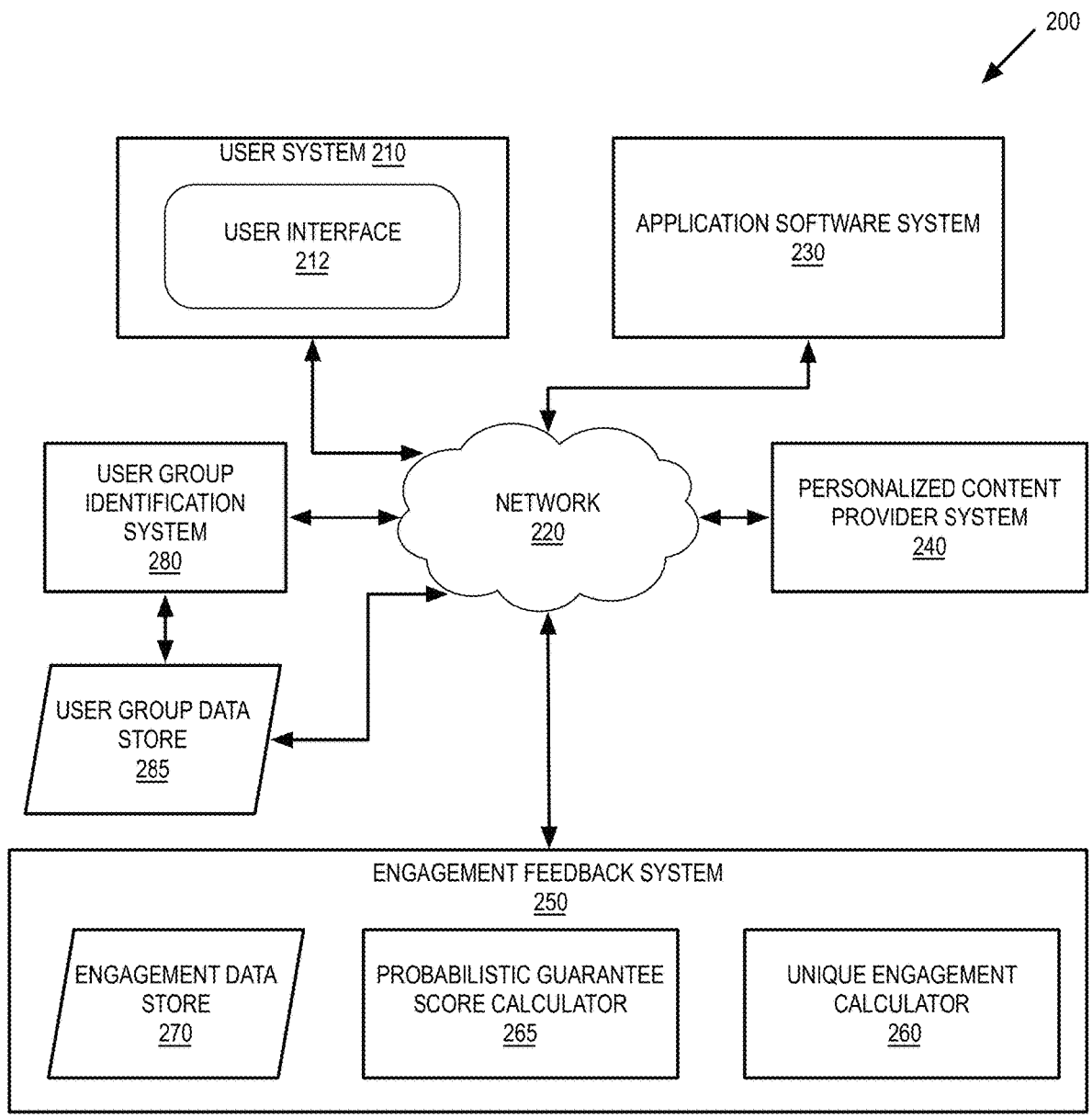
FIG. 2 illustrates an example computing system that includes an engagement feedback system in accordance with some embodiments of the present disclosure.

Aspects of the present disclosure are directed to calculating estimated unique engagements with content, and assigning a probabilistic guarantee score, indicating the accuracy of the calculation, in the context of user groups.

Tracking user engagement with content is used to determine what content to present in the future, as well as to improve the quality and quantity of the content presented to the user. However, providing such engagement data can introduce potential user privacy issues because the interactions of individual users with the content are tracked. Tracking and providing information at the group level helps protect the privacy of individual users. However, when user interactions are tracked at the group level rather than per individual user, it is difficult to disambiguate engagements that are a single user engaging multiple times with content versus unique engagements with the content. For example, a total view count (e.g., a total number of views, including multiple views of a same user) for an online video can be accurately provided, but a total number of unique views (e.g., only counting each individual viewer once, regardless of the number of times each viewer viewed the video) cannot be identified at a group level.

Conventional systems that track engagement by user group have been unable to provide unique-count engagement data. Some conventional approaches may use user identity information to determine unique engagements. However, in these conventional approaches, there is a risk of data disclosure that may be objected to by users and/or inconsistent with user privacy laws in some jurisdictions.

Aspects of the present disclosure address the above and other deficiencies of conventional approaches by providing a system for calculating an estimated unique engagement count, while protecting user privacy. As the world is moving towards a more private internet, there is immense interest in the whole industry to seek protocols to protect individual user privacy. An emerging protocol involves the use of group identity. In group identity approaches, a content provider maps its user base to a set of groups, and as a user interacts with various content, the content provider restricts itself to only using the group identifiers and not the individual user identity in the personalization of its content. This protects user privacy, but complicates the measurement of various user statistics, which are crucial to the content provider and others for generating system performance metrics and other measurements. For example, a common quantity to measure is the unique number of users who visited the provider within a given time period. This is straightforward to measure with user identities, but it becomes difficult under the group identity protocol. As another example, a common quantity of interest is the number of unique users who have browsed a particular content, or more generally, the number of users who have browsed the content less than a certain number of times. These are useful statistics for the content provider to assess the popularity of its content, and may also be used as part of engagement-based business models. The number of unique visitors is of special interest for content providers, advertisers, and others to whom the number of individuals reached is the relevant statistic.

The disclosed technologies use group identity for receiving, serving, and tracking requests. In these group-based requests, a group identity is used for tracking. Each group identity maps to a collection of user identities, thus preserving user privacy since it is not possible to identify actions of an individual user based on group identity tracking data. However, this complicates reach or engagement measurement and optimization because user identity is hidden and no longer accessible. As a result, it's impossible to tell with certainty, based on the group identity, that a specific request generates the unique reach or engagement intended. To overcome these and other challenges in the measurement of unique reach or engagement with group identities, the disclosed technologies estimate the unique reach or engagement count based on group identity (ID) tracking data. The described approaches, in one embodiment, also provide a probabilistic guarantee score of the unique reach or engagement count estimate as a way to assess the accuracy of the estimated unique engagement.

FIG. 1 illustrates one embodiment of a user interface including output of an engagement feedback system in accordance with some embodiments of the present disclosure. A particular piece of content 100 is shown. In this example, the piece of content 100 includes an online invitation. There are a number of types of interactions with this piece of content 100. Interactions with content may include for example, viewing the content, subscribing to a content provider, reacting to the content, responding to the content, resharing the content, or otherwise engaging with the content. The user interface shows counts for different interaction types, including RSVPs 112, reactions 114, and the estimated number of unique engagements 116 computed as described herein.

In one embodiment, the estimated number of unique engagements includes a probabilistic guarantee score 118, which indicates a system-generated level of confidence in the estimated number of unique engagements score. This allows the system to provide feedback to, for example, the content creator, content provider, and/or content stream manager, while maintaining the privacy of the individual users who engaged with the content. The unique engagements 116 are important to the person who wrote or distributed the content, to help ensure their content is engaging. Unique engagements 116 are also valuable to a personalized content provider, such as an online network system which provides content to users.

For simplicity, this disclosure will use as an example an online network system. Online network systems include but are not limited to connections network software, such as professional and/or general social media platforms, and systems that are or are not be based on connections network software, such as digital content distribution services, job listing software, recruiter software, sales assistance software, advertising software, learning and education software, or any combination of any of the foregoing. However, the disclosed technologies can be used with any application, which displays content to users and utilizes group identity protocols to protect user privacy.

FIG. 2 illustrates an example computing system 200 that includes an engagement feedback system in accordance with some embodiments of the present disclosure. In the embodiment of FIG. 2, computing system 200 includes a user system 210, a network 220, an application software system 230, a personalized content provider system 240, a user group identification system 280, and an engagement feedback system 250.

User system 210 includes at least one computing device, such as a personal computing device, a server, a mobile computing device, or a smart appliance. User system 210 includes at least one software application, including a user interface 212, installed on or accessible by a network to a computing device. For example, user interface 212 can be or include a front-end portion of application software system 230.

User interface 212 is any type of user interface as described above. User interface 212 can be used to input search queries and view or otherwise perceive output that includes data produced by application software system 230 or personalized content provider system 240. For example, user interface 212 can include a graphical user interface and/or a conversational voice/speech interface that includes a mechanism for entering a search query and viewing query results and/or other digital content. Examples of user interface 212 include web browsers, command line interfaces, and mobile apps. User interface 212 as used herein can include application programming interfaces (APIs).

Personalized content provider system 240 in one embodiment selects and displays a sequence of content elements. The personalized content provider system 240 may display such content in response to a search. The content elements may be posts, videos, articles, or other content from the personalized content provider system 240. In one embodiment, the content elements may be created by individual users for posting, and displayed by the personalized content provider system 240. In one embodiment, there may be different types of data presented including text, video, audio, etc. The content provider in this context may include a content creator, which may be an individual, a corporation, or a group, as well as a content curator. A content curator may be an individual, corporation, or algorithm which puts together a feed of content from one or more content creators for presentation to a user.

In one embodiment, there can be different sources which provide data content to personalized content provider system 240. Personalized content provider system 240 can reside on at least one persistent and/or volatile storage device that can reside within the same local network as at least one other device of computing system 200 and/or in a network that is remote relative to at least one other device of computing system 200. Thus, although depicted as being included in computing system 200, the personalized content provider system 240 can be part of computing system 200 or accessed by computing system 200 over a network, such as network 220.

Application software system 230 is any type of application software system that includes or utilizes functionality provided by the engagement feedback system 250. Examples of application software system 230 include but are not limited to connections network software, such as social media platforms, and systems that are or are not be based on connections network software, such as general-purpose search engines, job software, recruiter software, sales assistance software, advertising software, learning and education software, or any combination of any of the foregoing. The application software system 230 can include a system that provides data to network software such as social media platforms or systems.

While not specifically shown, it should be understood that any of user system 210, application software system 230, personalized content provider system 240, user group identification system 280, and engagement feedback system 250 may include an interface embodied as computer programming code stored in computer memory that when executed causes a computing device to enable bidirectional communication with any other of user system 210, application software system 230, personalized content provider system 240, user group identification system 280, and engagement feedback system 250 using a communicative coupling mechanism. Examples of communicative coupling mechanisms include network interfaces, inter-process communication (IPC) interfaces and application program interfaces (APIs).

A client portion of application software system 230 can operate in user system 210, for example as a plugin or widget in a graphical user interface of a software application or as a web browser executing user interface 212. In an embodiment, a web browser can transmit an HTTP request over a network (e.g., the Internet) in response to user input that is received through a user interface provided by the web application and displayed through the web browser. A server running application software system 230 and/or a server portion of application software system 230 can receive the input, perform at least one operation using the input, and return output using an HTTP response that the web browser receives and processes.

Each of user system 210, application software system 230, personalized content provider system 240, user group identification system 280, and engagement feedback system 250 is implemented using at least one computing device that is communicatively coupled to electronic communications network 220. Any of user system 210, application software system 230, personalized content provider system 240, user group identification system 280, and engagement feedback system 250 can be bidirectionally communicatively coupled by network 220, in some embodiments. User system 210 as well as one or more different user systems (not shown) can be bidirectionally communicatively coupled to application software system 230 and personalized content provider system 240.

A typical user of user system 210 can be an administrator or end user of application software system 230, personalized content provider system 240, or engagement feedback system 250. User system 210 is configured to communicate bidirectionally with any of application software system 230, personalized content provider system 240, and engagement feedback system 250 over network 220, in one embodiment. In another embodiment, the user system 210 communicates with application software system 230 and personalized content provider system 240, but does not directly communicate with engagement feedback system 250.

The features and functionality of user system 210, application software system 230, personalized content provider system 240, user group identification system 280, and engagement feedback system 250 are implemented using computer software, hardware, or software and hardware, and can include combinations of automated functionality, data structures, and digital data, which are represented schematically in the figures. User system 210, application software system 230, personalized content provider system 240, user group identification system 280, and engagement feedback system 250 are shown as separate elements in FIG. 2 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 220 can be implemented on any medium or mechanism that provides for the exchange of data, signals, and/or instructions between the various components of computing system 200. Examples of network 220 include, without limitation, a Local Area Network (LAN), a Wide Area Network (WAN), an Ethernet network or the Internet, or at least one terrestrial, satellite or wireless link, or a combination of any number of different networks and/or communication links, as well as wired networks, or computer busses when the system 200 is implemented on a single computer system. The various elements can be connected with different networks and/or types of networks.

The computing system 200 includes an engagement feedback system 250 that can calculate the unique engagements with a piece of content provided by personalized content provider system 240, or another system. The engagement feedback system 250 in one embodiment provides estimated unique engagement data to the personalized content provider system 240. In one embodiment, engagement feedback system 250 can be queried by user systems 210 associated with data consumers. In some embodiments, the application software system 230 includes at least a portion of the engagement feedback system 250. As shown in FIG. 11, the engagement feedback system 250 can be implemented as instructions stored in a memory, and a processing device 1102 can be configured to execute the instructions stored in the memory to perform the operations described herein.

The engagement feedback system 250 utilizes the user group data, from a memory of user group data store 285. The group data is used to associate user actions with a user group to which the user belongs. The user groups are defined by user group identification system 280. In one embodiment, users are grouped by user characteristics. In one embodiment, a single user may be categorized into multiple groups by the user group identification system 280. In another embodiment, only one group association is used for a user for any engagements with a piece of content.

The engagement data store 270 stores the calculated unique engagement value and probabilistic guarantee score for the content items. The disclosed technologies can be described with reference to the types of content displayed in a social graph application such as a professional social network application. The disclosed technologies are not limited to data associated with social graph applications but can be used to evaluate the engagement values of content more generally. The disclosed technologies can be used by many different types of network-based applications in which display content to users. For example, any video sharing or social media platform which displays content to users could take advantage of such a system.

Further details with regards to the operations of the engagement feedback system 250 and the personalized content provider system 240 are described below.

Figure 3:
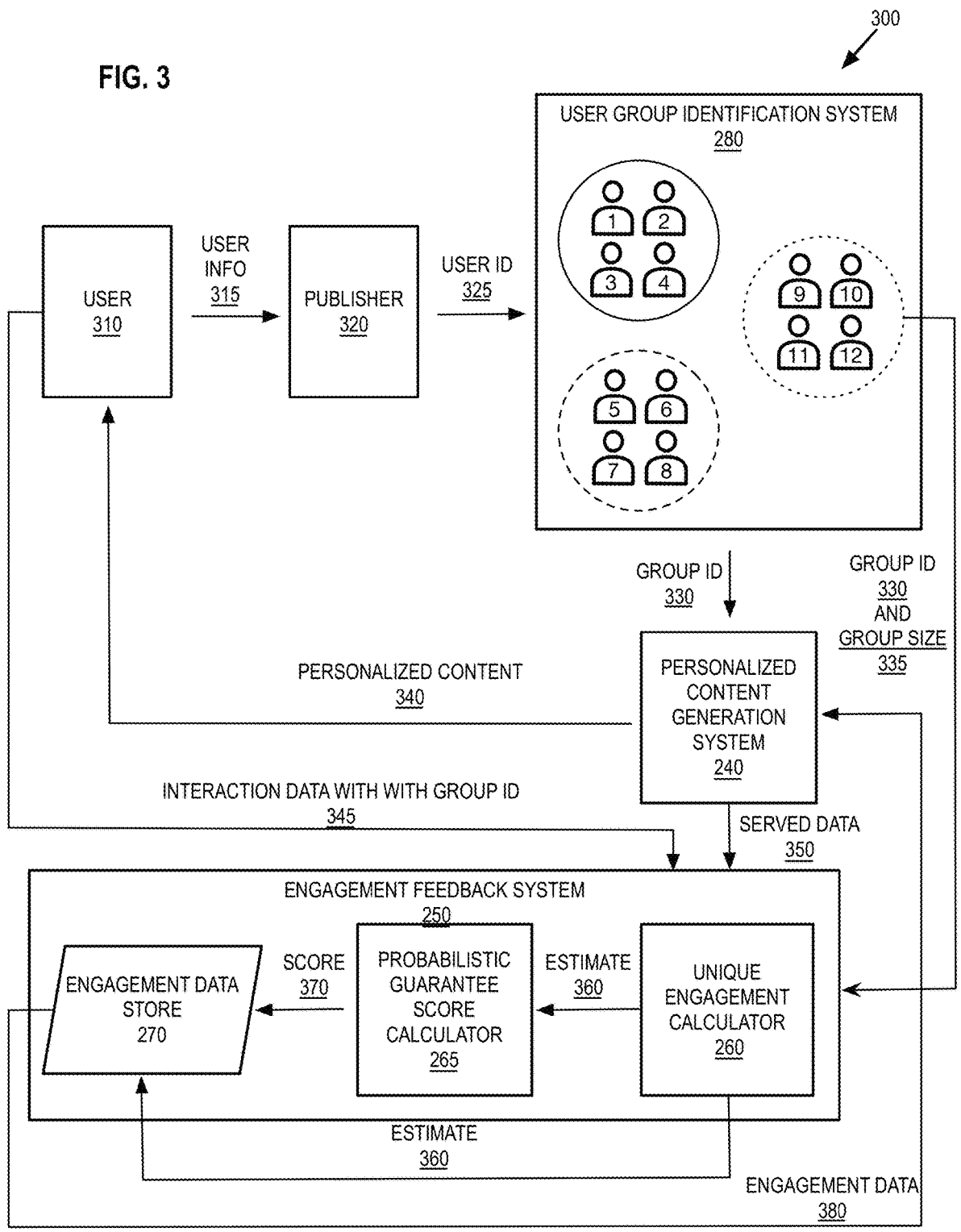
FIG. 3 illustrates a signal flow diagram showing data transfers between elements of an engagement feedback system in accordance with some embodiments of the present disclosure.

FIG. 3 illustrates a signal flow diagram showing data transfers between elements of an engagement feedback system in accordance with some embodiments of the present disclosure. The personalized content generation system 240 can be any data source, internal or external to the system that provides data personalized content 340 to a user 310. In one embodiment, personalized content generation system 240 provides information about the personalized content 340 to the engagement feedback system 250, as served data 350. In one embodiment, the personalized content generation system 240 may be any online system that can be accessed by users, and which permits users to interact with the content presented.

In one embodiment, user information 315 is provided to a publisher 320, which provides a user ID 325 to user group identification system 280. The user group identification system 280 categorizes users into one or more groups. In one embodiment, the size of the groups is determined by the publisher 320. In one embodiment, the default size of groups is in a range of about 10 to about 20 users. In one embodiment, the group size may be adjusted, as will be described below. In one embodiment, the group size is determined to ensure user privacy. In one embodiment, the system may include groups of different sizes. In one embodiment, group size may range from five users to as large as 100 or more users. In one embodiment, single member user groups may be defined, to enable the system to be used in mixed groups in which some users are anonymized, with data provided and interactions tracked based on group activity, and other users are not anonymized.

The group ID 330 is provided to personalized content generation system 240. The group ID 330 and group size 335 are provided to the engagement feedback system 250.

The engagement feedback system 250 receives interaction data 345 from users 310, with group ID information, as well as served data 350 from the personalized content generation system 230. The unique engagement calculator 260 utilizes the interaction data 345, group ID data 330, and served data 350, to calculate a unique engagement for each piece of content.

In one embodiment, the unique engagement calculator 260 calculates an estimated unique engagement value per group, based on the number of interactions by members of the group. The estimate 360 is passed to probabilistic guarantee score calculator 265, which calculates a probabilistic guarantee score for the estimate. The probabilistic guarantee score 370 is based in one embodiment on the group size 335 received from user group identification system 280. The score 370 and estimate 360 are stored in engagement data store 270.

The engagement feedback system 250 uses the collected data from engagement data store 270 to generate a final engagement data 380. The engagement data 380 includes the collective unique engagements across all groups and the associated probabilistic guarantee score.

This information, in one embodiment, may be provided with the content served to user 310, for example as shown in FIG. 1. In one embodiment, the engagement data 380 may also be made available to the content creator, content provider, content curator, or other entity that has interest in this information. In some embodiments, the per-group engagement data 380 may be provided as well.

In this way, the system automatically generates and provides unique engagement data based on the group identity data, along with an associated probabilistic guarantee score for the engagement data, thereby providing engagement information while protecting user privacy.

Figure 4A:
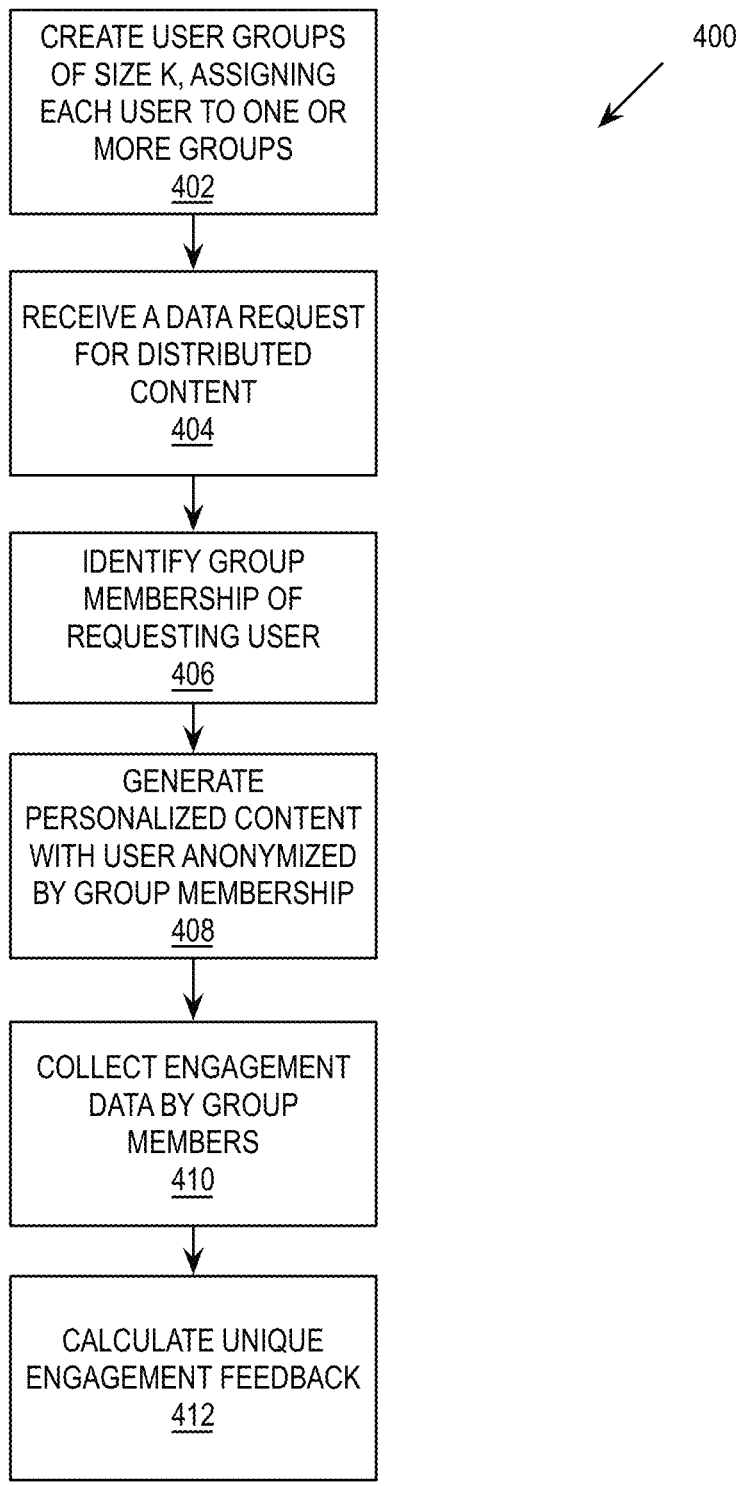
FIG. 4A is a flow diagram of an example method to provide engagement feedback in accordance with some embodiments of the present disclosure.

FIG. 4A is a flow diagram of an example method 400 to provide unique engagement data in accordance with some embodiments of the present disclosure.

At operation 402, user groups are created, and users are assigned to one or more groups. In one embodiment, each user is assigned to one group. In another embodiment, a user may be in multiple groups. The user group size in one embodiment is uniform across groups. The group size K is used, in one embodiment, where K is a positive integer. In another embodiment, group size may vary. In one embodiment, for mixed groups in which some users are privacy protected by group identity and others aren't, the users that are not privacy protected are in groups of size one.

As a way to protect user privacy, the internet content provider creates user groups of size K, and each user is assigned to one or more user groups. In one embodiment, the user groups are created based on commonalities (e.g., common attribute values) between the users. For example, groups may be created based on user locations, user interests, user ages, or other commonalities between users. When a user visits the content provider, the user's information is passed to group identification system, such as user group identification system 280 of FIG. 2, where the system returns one of the groups that contain this user, which is fed into the downstream system that generates personalized content. The downstream system may be the personalized content generation system 240 of FIG. 2.

At operation 404, a data request is received for distributed content. In one embodiment, the data request may be automatically generated when the user engages with an online network system. In another embodiment, the data request may be a request made by the user, for example by entering search terms into a system. In one embodiment, the data request may be a request to read a feed on an online network system.

At operation 406, the group membership of the requesting user is identified. The group membership in one embodiment is the group ID associated with the user.

At operation 408, the personalized content is generated for the requesting user, with the identity of the requesting user anonymized by the group membership.

At operation 410, data is collected for engagement with the content by group members. In one embodiment, the engagement may include a variety of interactions with the content including viewing it, clicking to see more, liking, or otherwise rating the content, responding to the content, subscribing to the content provider, rating the content, etc. Because the system only tracks users as members of a group, such engagement is associated with the group, rather than the individual user.

At operation 412, the unique engagement feedback is calculated based on a combination of the group engagements, group size, and statistical analysis, as will be described below. The calculation of the unique engagement data may include calculating a unique engagement estimate and optionally a probabilistic guarantee score associated with the unique engagement estimate, which indicates the accuracy of the unique engagement estimate.

In one embodiment, method 400 is used continuously as users engage with data content. In one embodiment, the method 400 continuously monitors new engagements with the data, and recalculates the engagement feedback for the data. In another embodiment, the data may be recalculated after a threshold number of new engagements are counted. In one embodiment, after the initial calculation, only operations 404 through 412 are used. The initial user group creation may be a one-time process for each data provider, and updates may be incremental, as users join and leave, new users are added to existing groups and new groups are added as needed, and the existing users are not reassigned to new groups. In another embodiment, the system periodically reconstructs the user groups as new users join, or other users leave the system. In one embodiment, the group reconstruction may occur periodically, whether or not users have joined or left. In one embodiment, the groups are reconstructed on a weekly basis.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the engagement feedback system 250 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4B:
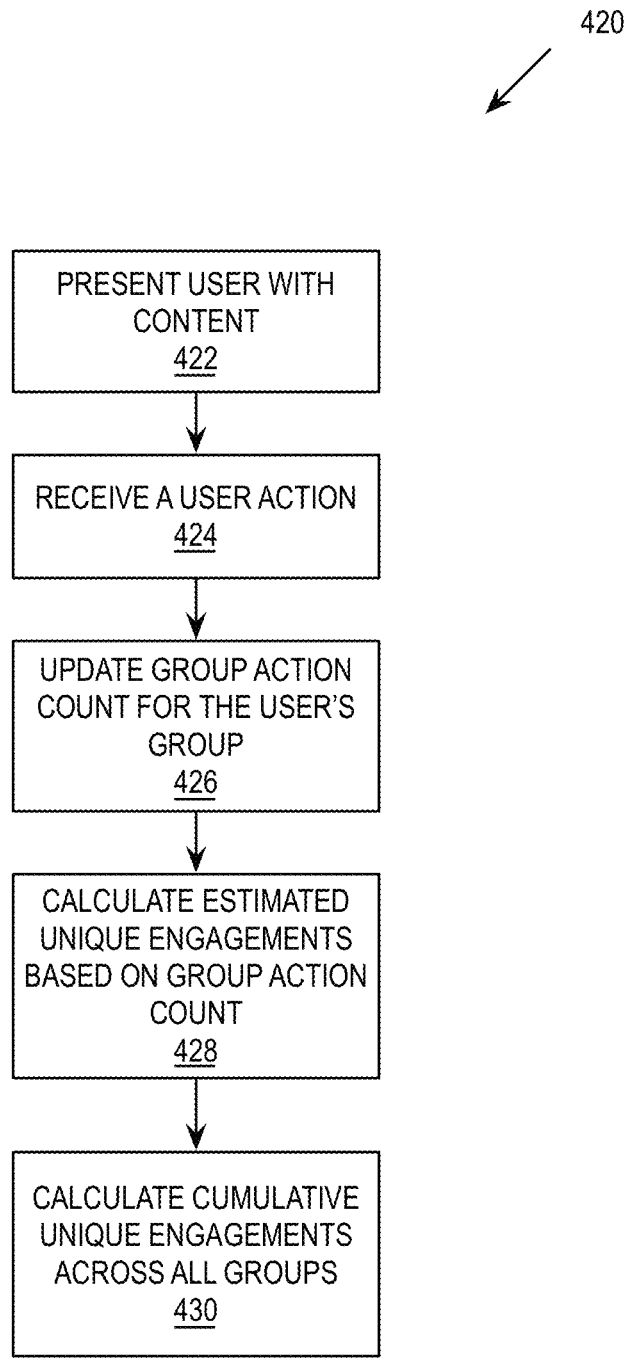
FIG. 4B is a flow diagram of an example method to provide engagement feedback in accordance with some embodiments of the present disclosure.

FIG. 4B is a flow diagram of an example method 420 to provide engagement feedback in accordance with some embodiments of the present disclosure.

At operation 422, the user is presented with content. This content may be a feed of posts or articles or videos.

At operation 424, a user action is received. As noted above, because the user is not identified, there is no identity associated with the user action, except the group identifier for the user.

At operation 426, the group action count for the user's group is updated. The group action count is the number of interactions by users in a particular group with a particular piece of content.

At operation 428, the estimated unique engagements are calculated. In one embodiment, method 420 is used continuously as users engage with data content. In one embodiment, the method 420 continuously monitors new engagements with the data, and recalculates the engagement feedback for the data. In another embodiment, the data may be recalculated after a threshold number of group actions are counted.

At operation 430, the cumulative estimated number of unique engagements are calculated across all groups for the content. In one embodiment, the system calculates the per group calculated estimated number of engagements based on group actions for each group, and then sums those calculations to arrive at the final cumulative estimated number of unique engagements.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the engagement feedback system 250 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 5:
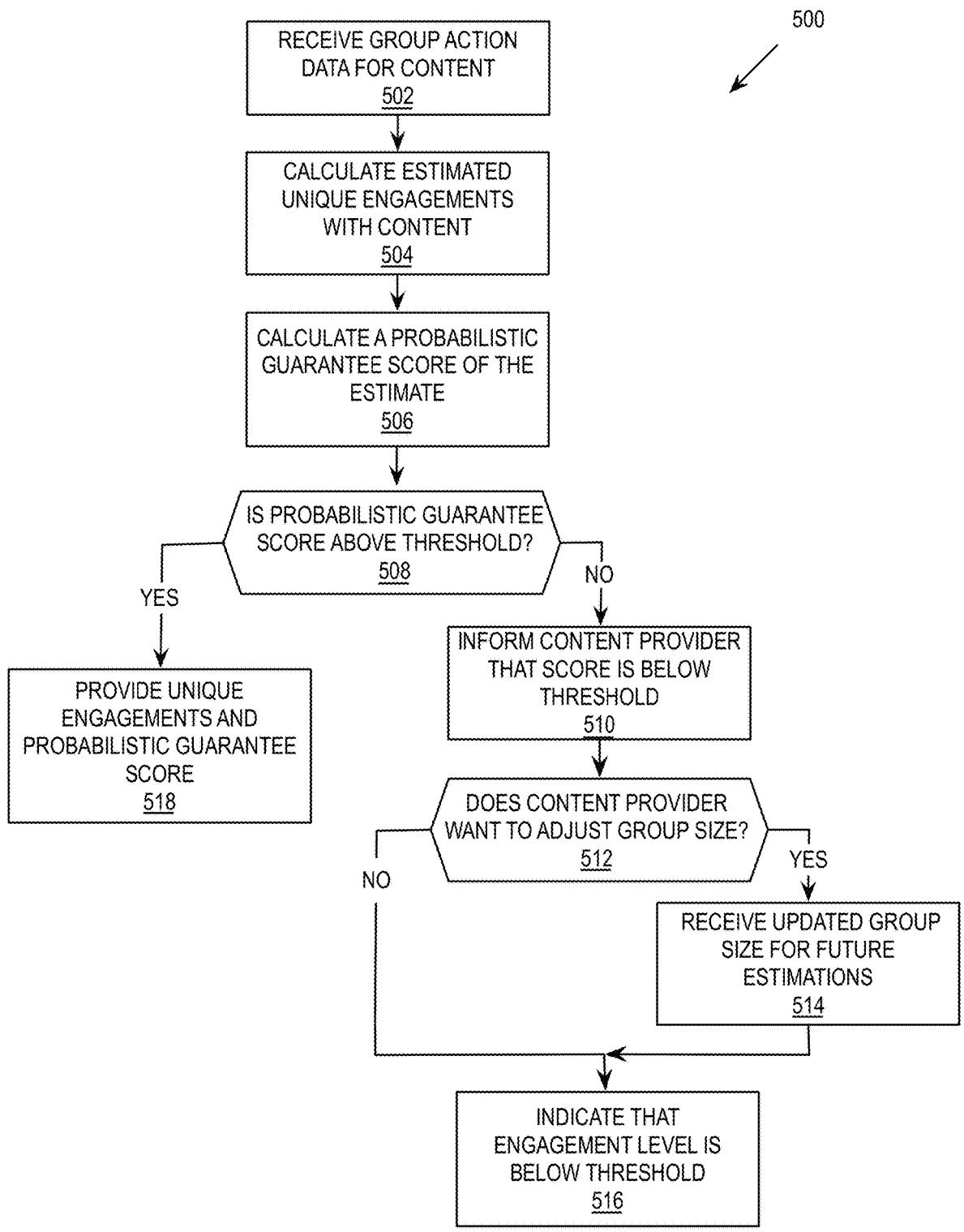
FIG. 5 is a flow diagram of an example method to provide engagement feedback with probabilistic guarantee scoring in accordance with some embodiments of the present disclosure.

FIG. 5 is a flow diagram of an example method 500 to provide engagement feedback with probabilistic guarantee scoring in accordance with some embodiments of the present disclosure.

At operation 502, group action data is received for the content. The group action count indicates the number of interactions all members of a group had with a particular piece of content in a timeframe. For each user action t, the particular user that generates the action is non-identifiable, but the system has access to the Group ID of the user group that is associated with the user action.

At operation 504, the estimated unique engagements with the content are calculated. In one embodiment, the below calculation is used. For this calculation, the following variables are defined:

i is the user index, enabling calculations per user, and used in the summation of user actions from user 1 to N, the total number of users j is the user group index, enabling calculations per group, and used in the summation of group actions from group 1 to M, the number of user groups k is the size of the group T is the total number of user actions counted j_t is the index of the user group that is associated with the user action U_j is the set of user indices in a group G_i is the set of group indices that contains user i n_j is the number of actions from user group j within a time window The calculated number of unique user engagements for a group is then $$\sum_{i=1}^{N}\left(1-\left(1-\frac{1}{k}\right)^{\sum_{j\in G_i} n_j}\right) \quad \text{(Equation 1)}$$

That is, summing over all the users (index i of users is used to sum the estimate from user 1 to user N), and the timeframe when users interacted with the content, the equation can be used to estimate the number of unique interactions with the content during the timeframe in question.

This estimate may be generalized to calculate the number of users who had a certain number of interactions (c) with the content. In one embodiment, the "estimated unique interactions" measures the number of users who have had more than a set number of interactions with the content. The default set number is one, that is any one interaction with a piece of content is sufficient. In another embodiment, the set number may be a different number. In one embodiment, the set number may be three interactions. In one embodiment, the content provider supplies the set number of interactions for this calculation. That measurement is:

$$\sum_{i=1}^{N}\left(\sum_{l=1}^{c} \mathit{lf}\left(l; \sum_{j\in G_i} n_j, \frac{1}{k}\right)+c-cF\left(c; \sum_{j\in G_i} n_j, \frac{1}{k}\right)\right) \quad \text{(Equation 2)}$$

where f is a binomial distribution probability density function, and

F is the cumulative density function

At operation 506, the probabilistic guarantee score of the estimate is calculated. The probabilistic guarantee score indicates the accuracy of the estimated number of unique engagements. In one embodiment, the calculation for the probabilistic guarantee score is:

$$P(|R-E[R]| \geq \epsilon s) \leq \frac{1}{\epsilon^2}, \text{ where} \quad \text{(Equation 3)}$$

$$s^2 = \sum_{i}\text{Var}[R_i] + \sum_{i\neq i'}\text{Cov}[R_i, R_{i'}], \text{ with}$$

$$\text{Var}[R_i] = \left(1-\left(1-\frac{1}{k}\right)^{\sum_{j\in G_i} n_j}\right)\left(1-\frac{1}{k}\right)^{\sum_{j\in G_i} n_j}, \text{ and}$$

$$\text{Cov}[R_i, R_{i'}] = \left(1-\frac{1}{k}\right)^{\sum_{j\in G_{i'}\cup G_i} n_j}\left(\left(1-\frac{2}{k}\right)^{\sum_{j\in G_{i'}\cup} n_j}-\left(1-\frac{1}{k}\right)^{2\sum_{j\in G_{i'}\cap} n_j}\right)$$

The probabilistic guarantee score is an error bar on the estimated unique engagements value calculated.

Figure 8:
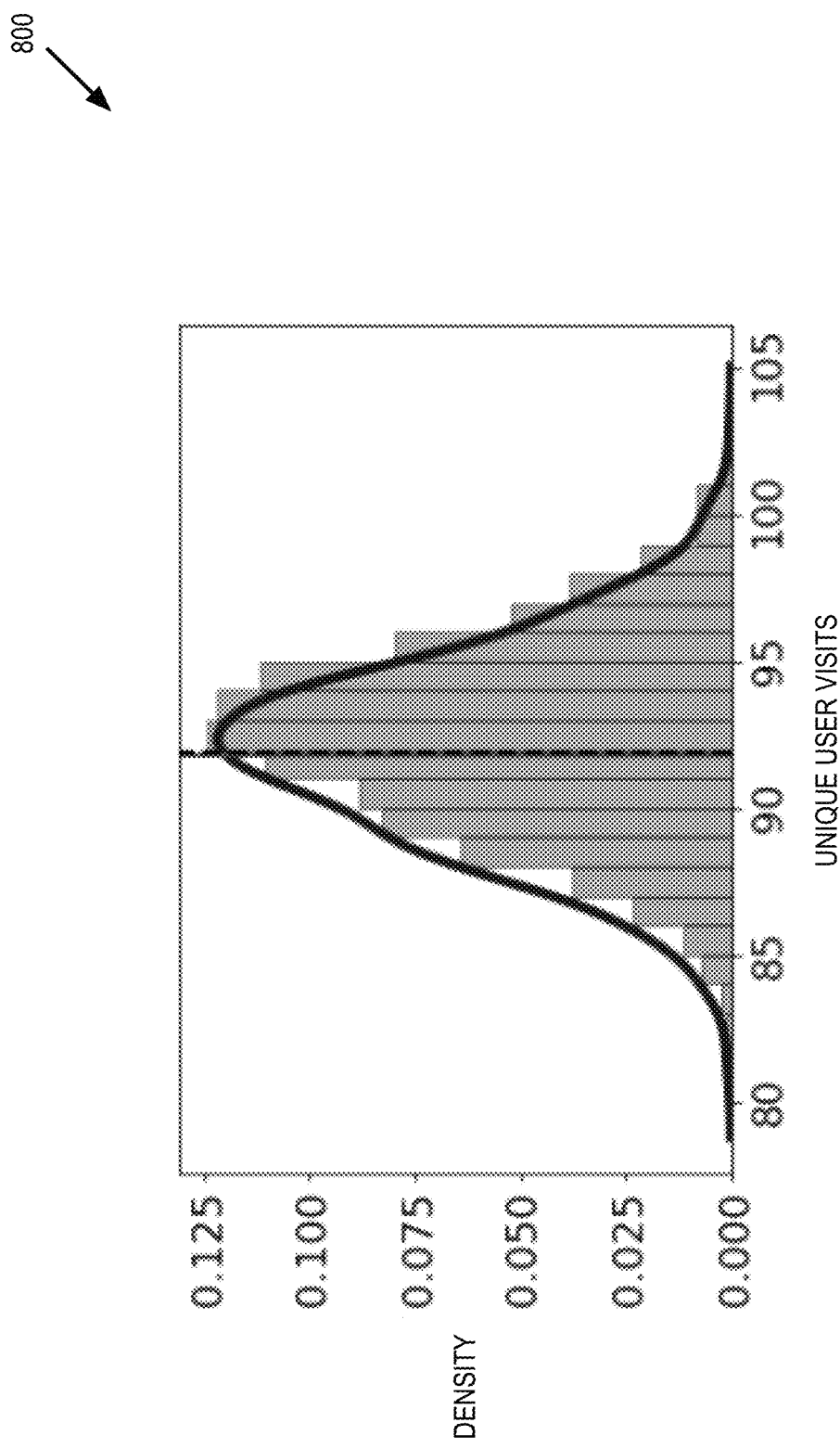
FIG. 8 is a diagram of a graph of density versus unique user visits showing accuracy of estimation with some embodiments of the present disclosure.
Figure 9:
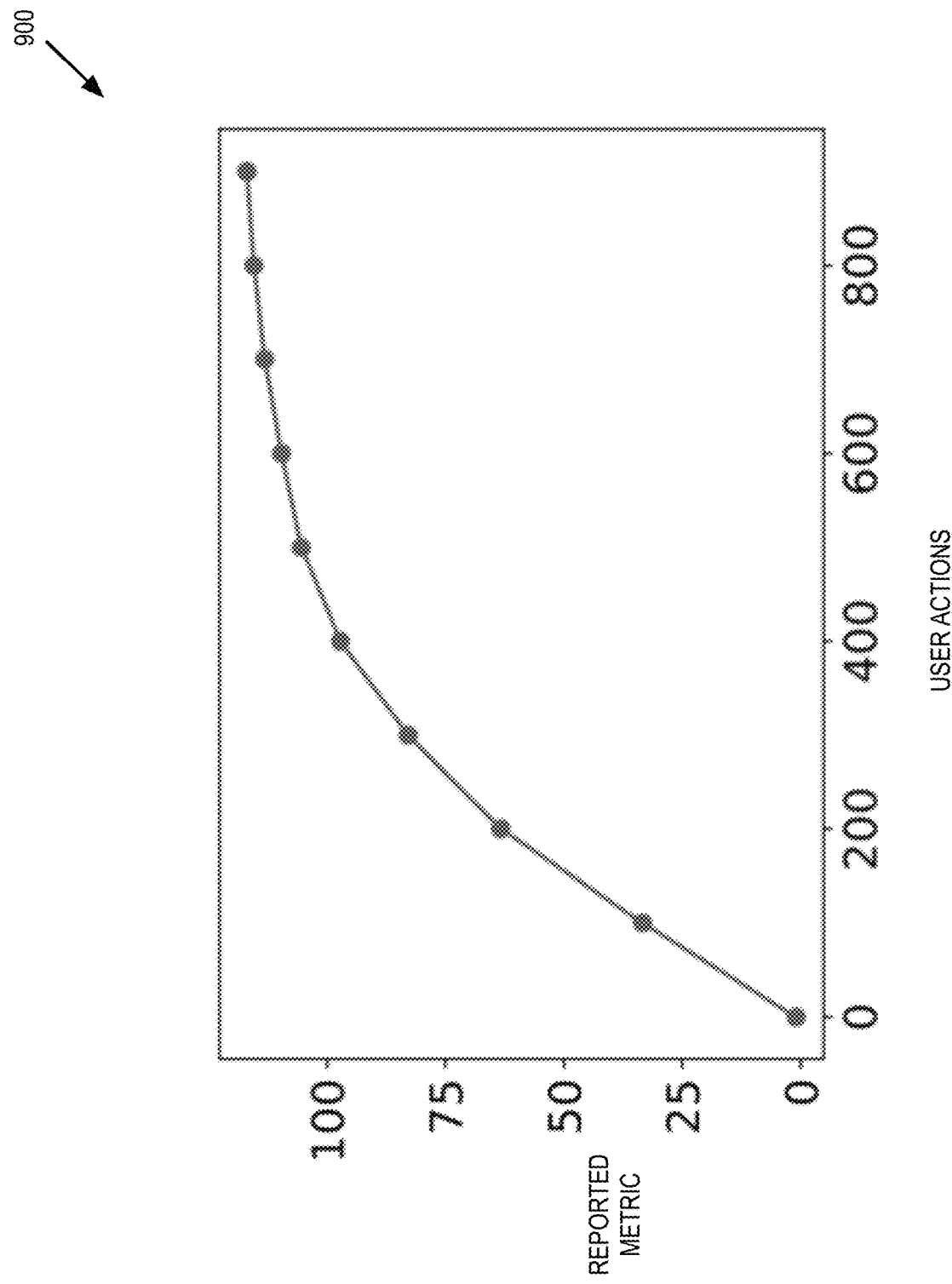
FIG. 9 is a diagram of a graph of reported metrics versus user actions showing the relationship between these values for some embodiments of the present disclosure.

FIG. 8 illustrates the test results 800 from using this method, showing the distribution of user actions with empirical mean, and the measurement generated by this method. The center dashed line illustrates that the formula for calculating the estimated unique engagements matches the most likely distribution, as shown. FIG. 9 illustrates the demonstration of the measurement of time as users take actions.

Returning to FIG. 5, at operation 508, the process determines whether the probabilistic guarantee score is above a threshold value. In one embodiment, the threshold value is between 50% and 99%. In one embodiment, the default threshold 75%. In one embodiment, the threshold value may be adjustable by the content provider.

If the probabilistic guarantee score is above the threshold, at operation 518, the estimated unique engagements and associated probabilistic guarantee are provided. This data may be displayed by the content provider system to viewers, in one embodiment. The data may also be displayed to the content creator. In one embodiment, the probabilistic guarantee score is not provided to viewers.

If the probabilistic guarantee score was below the threshold, at operation 508, at operation 510, the system notifies the content provider that the score is below the threshold. In one embodiment, the score is not displayed, and instead an indicator is provided that the estimated number of unique engagements is not available. In one embodiment, the indicator may note that the estimated number of unique engagements has a probabilistic guarantee score below the threshold. In one embodiment, the group action score and the estimated number of unique engagements and its associated probabilistic guarantee score is provided to the content provider.

Figure 10:
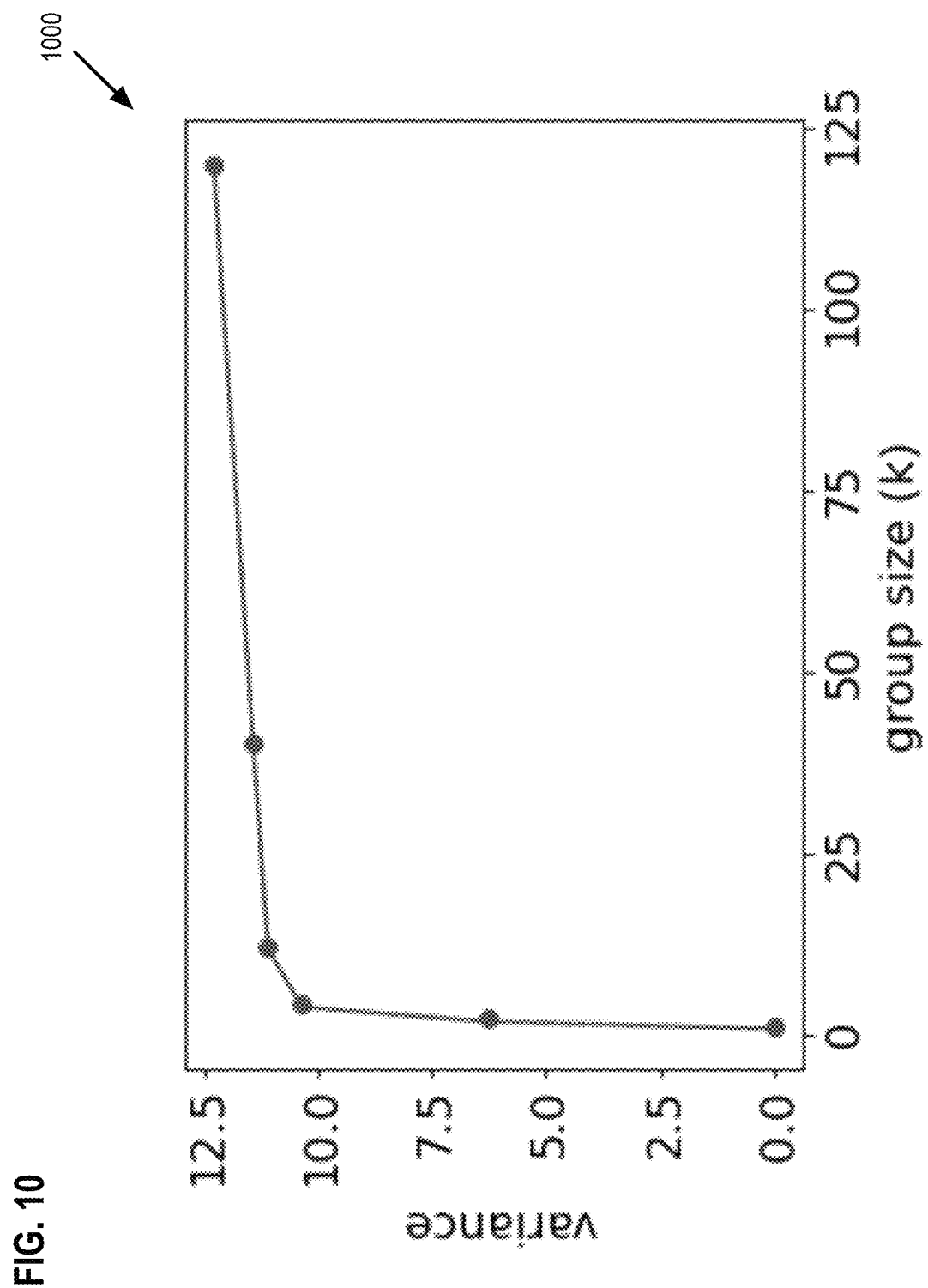
FIG. 10 is a diagram of a graph illustrating an exemplary relationship between the group size and variance, for some embodiments of the present disclosure.

At operation 512, the system determines whether the data provider requested a group size adjustment to improve the probabilistic guarantee score. The probabilistic guarantee score depends on both the engagement level and the group size. While the engagement level cannot be controlled, the group size can be adjusted to provide a more accurate estimate of the unique engagement count. When the number of users in a group is lower, the accuracy of the estimate is higher. FIG. 10 is a diagram of a graph illustrating an exemplary relationship between the group size and variance, for some embodiments of the present disclosure. At k=1, the measurement is deterministic-if the group has been reached, every user has been reached. As user privacy is introduced by increasing group size, there is an increase in the variance. The increase in measurement uncertainty increases as the number of users increases. The measurement uncertainty, or estimate accuracy, is shown by the probabilistic guarantee score.

If the data provider requests to adjust the group size, at operation 514, an updated group size is received from the content provider for future estimations. The process going forward utilizes the updated group size to provide estimates. The new group size is used in tracking subsequent interactions with the content, and with other content from the content provider.

At operation 516, the indication that the engagement level is below the threshold for a unique engagement count is returned to the content provider. In one embodiment, this information may be displayed with the content. In one embodiment, whether or not to display this information is configurable by the content provider.

This process 500 is in one embodiment is run periodically to provide the unique engagements for content. In this way, the present system provides the unique engagement and probabilistic guarantee data for content, when the probabilistic guarantee is above the threshold.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the engagement feedback system 250 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 6:
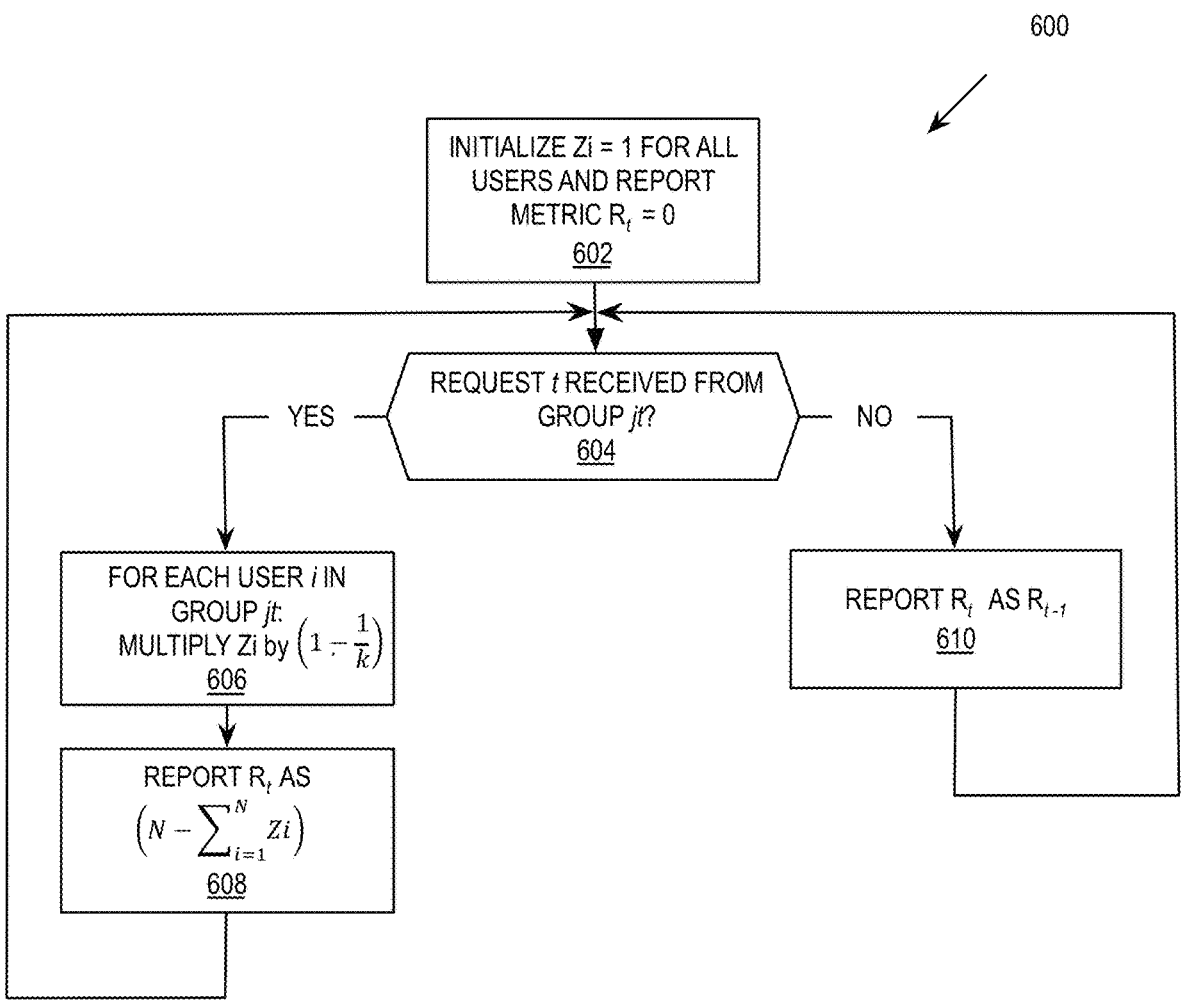
FIG. 6 is a flow diagram of an example method to calculate unique engagements for the engagement feedback calculation in accordance with some embodiments of the present disclosure.

FIG. 6 is a flow diagram of an example method 600 to calculate unique engagements for the engagement feedback calculation in accordance with some embodiments of the present disclosure. This illustrates the incremental counting process. At operation 602, the system initializes $Z_i=1$ for all users, and initializes the report metric of $R_t=0$. Here, $Z_i$ is the counter for each user, a random variable, which is one when the user has been previously reached, and $R_t$ is the number of unique engagements for the group.

At operation 604, the system determines whether a request t has been received from group jt. As noted above, group jt is the index of the user group associated with the action t. A request indicates an engagement with the content, in one embodiment.

If a request has been received, at operation 606, for each user i in group jt, the system multiplies $Z_i$ by $$\left(1-\frac{1}{k}\right),$$

where k is group size. Thus, if the group is very large, the change in the value is very small. This updates the value of $Z_i$. For example, for a group size of 10, at the first iteration $Z_i$ is updated from 1 to 0.9, for each subsequent iteration, $Z_i$ decreases.

At operation 608, $R_t$ is reported as $(N-\Sigma_{i=1}^{N}Z_i)$. That is, the interaction rate, $R_t$ is calculated for the first interaction for an exemplary a group of 10 users, as N–the sum of $Z_i$ for each user.

If there is no new request, as determined at operation 604, the value of $R_t$ is reported as $R_{t-1}$, that is, the same value as prior to the request, at operation 610. The process then returns to operation 604, to continue monitoring for new requests.

The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the engagement feedback system 250 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 7:
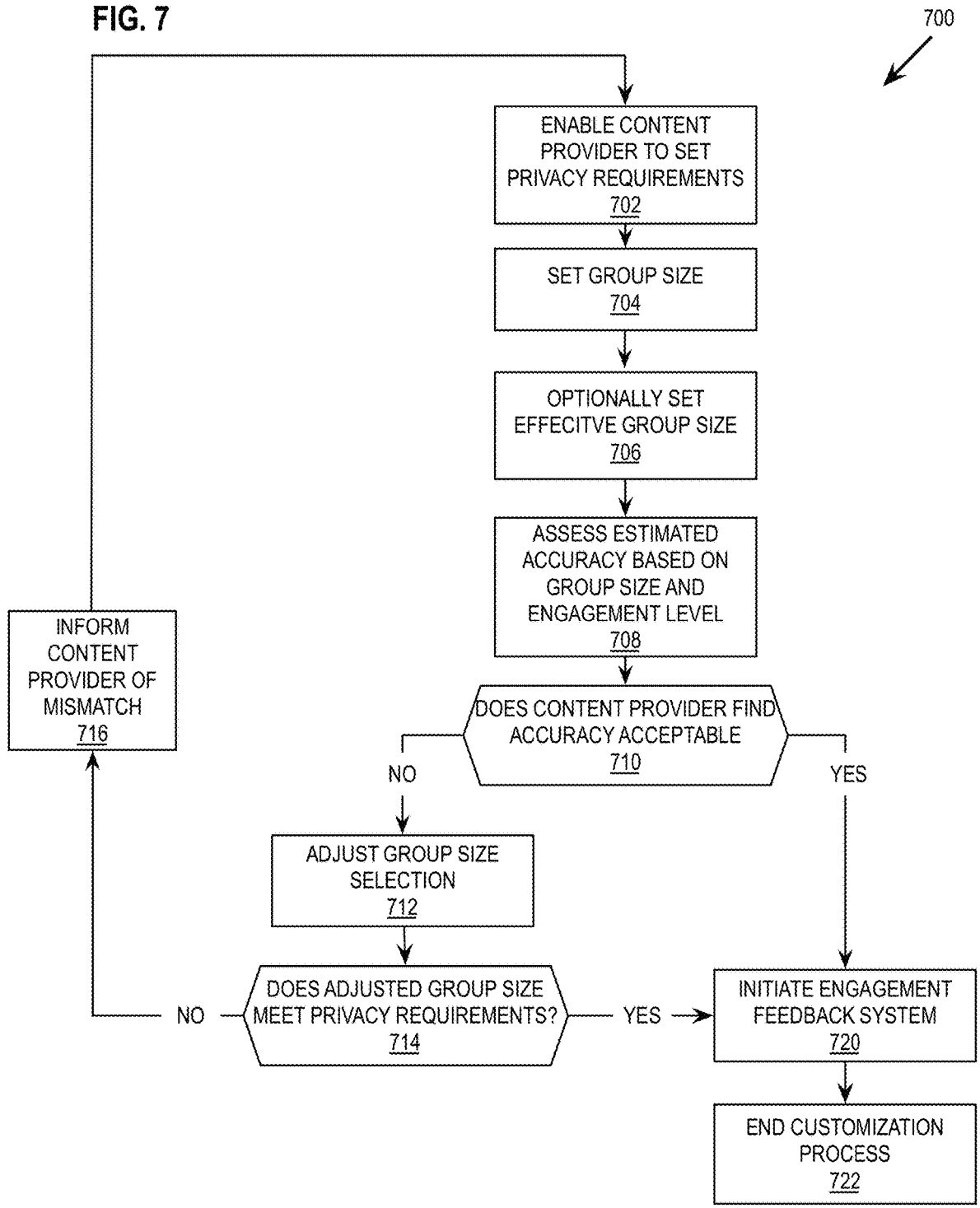
FIG. 7 is a flow diagram of an example method to adjust group size for privacy and accuracy of calculations in accordance with some embodiments of the present disclosure.

FIG. 7 is a flow diagram of an example method 700 to adjust group size for privacy and accuracy of calculations in accordance with some embodiments of the present disclosure. This customization process 700 maybe initiated at any time.

At operation 702, the data provider can set privacy requirements. Privacy requirements, in one embodiment, may be set based on user types. For example, for users under 13, the legal requirements for privacy are higher than for adult users. In one embodiment, the privacy requirements may be high, medium, and low. The privacy requirement, in one embodiment, defines the size of the user groups. The larger the group, the higher the privacy level. In a hypothetical group of one user, there is no privacy. The group interaction count directly corresponds to the actions from the one user in the group. In contrast, in a hypothetical group of one hundred users, the possibility of identifying an action from any particular user is nearly impossible.

At operation 704, the group size is set. In one embodiment, the group size is set by the data provider. In another embodiment, the group size is set automatically based on the privacy level set by the data provider.

At operation 706, optionally an effective group size is set. Effective group size accounts for a differential level of activity between users in a group, when a subset of group members are consistently more active than the rest of the members of the group. Active users, in this context, refers to users who engage with content. A group in which some members are active and others inactive is referred to as a group with differentially active group members. The above calculations assume a uniform distribution of activity across all users in the group. That is, the assumption is that an interaction is equally likely to come from any group member. However, in some groups, some members show up more frequently than others, and not all members can be reached within the group. Such a non-uniform distribution of activity can lead to an overestimate of the unique engagements. To compensate for this, the system sets effective group size for the group, accounting for the portion of the group members who are not active. Effective group size is a fraction of the actual group size, based on the estimated percentage of active users within the group. The effective group size is determined based on historical activity data for the users selected for the group.

At operation 708, the system assesses the estimated accuracy for the unique engagement calculations, based on the selected group size and engagement level. If an effective group size was set, the estimated accuracy calculation uses the effective group size.

At operation 710, the data provider is informed of the estimated accuracy, for unique engagement calculations. In one embodiment, the estimated accuracy is provided as a range, based on an estimated engagement level.

If the data provider finds the accuracy level acceptable, at operation 720 the engagement feedback system is initiated. In one embodiment, the engagement feedback system calculates the estimated unique engagements for content from the data provider. The engagement feedback system in one embodiment also provides the probabilistic guarantee score for the estimated unique engagements. At operation 722, the customization process ends.

If the data provider does not find the accuracy level acceptable, at operation 712, the system in one embodiment enables the content provider to set a requested accuracy level for the probabilistic guarantee, and the system determines an adjusted group size based on the requested accuracy level. The group size selection is adjusted, based on the requested accuracy level. As noted above, reducing the group size increases accuracy. Therefore, if the data provider indicates that the estimated accuracy is insufficient, the system sets a lower group size.

At operation 714, the system determines whether the adjusted group size meets the privacy requirements of the data provider. As noted above, the group size directly impacts the level of privacy for the users. If the adjusted group size meets the requirements, the process initiates the engagement feedback system, at operation 720.

If the adjusted group size does not meet these requirements, the data provider is informed of this mismatch, at operation 716, and the process requests the data provider to update the privacy requirements, or set a different group size, returning to operation 702.

In this way, the data provider can customize the group size based on their preferred levels of privacy and accuracy. The methods described above can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods above are performed by the engagement feedback system 250 of FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 11 is a block diagram of an example computer system 1100 within which a set of instructions, for causing the machine to perform any one or more of the methodologies discussed herein, can be executed. In some embodiments, the computer system 1100 can correspond to a component of a networked computer system (e.g., the computer system 200 of FIG. 2) that includes, is coupled to, or utilizes a machine to execute an operating system to perform operations corresponding to the engagement feedback system 250 of FIG. 2. The machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a memory 1106 (e.g., flash memory, static random access memory (SRAM), etc.), an input/output system 1110, and a data storage system 1140, which communicate with each other via a bus 1130.

Processing device 1102 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1102 can also be one or more special-purpose processing devices such as an application specific integrated circuit (ASIC), a field programmable gate array (FPGA), a digital signal processor (DSP), network processor, or the like. The processing device 1102 is configured to execute instructions 1112 for performing the operations and steps discussed herein.

The computer system 1100 can further include a network interface device 1108 to communicate over the network 1120. Network interface device 1108 can provide a two-way data communication coupling to a network. For example, network interface device 1108 can be an integrated-services digital network (ISDN) card, cable modem, satellite modem, or a modem to provide a data communication connection to a corresponding type of telephone line. As another example, network interface device 1108 can be a local area network (LAN) card to provide a data communication connection to a compatible LAN. Wireless links can also be implemented. In any such implementation network interface device 1108 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system 1100.

Computer system 1100 can send messages and receive data, including program code, through the network(s) and network interface device 1108. In the Internet example, a server can transmit a requested code for an application program through network 1120 and network interface device 1108. The received code can be executed by processing device 1102 as it is received, and/or stored in data storage system 1140, or other non-volatile storage for later execution.

The input/output system 1110 can include an output device, such as a display, for example a liquid crystal display (LCD) or a touchscreen display, for displaying information to a computer user, or a speaker, a haptic device, or another form of output device. The input/output system 1110 can include an input device, for example, alphanumeric keys and other keys configured for communicating information and command selections to processing device 1102. An input device can, alternatively or in addition, include a cursor control, such as a mouse, a trackball, or cursor direction keys for communicating direction information and command selections to processing device 1102 and for controlling cursor movement on a display. An input device can, alternatively or in addition, include a microphone, a sensor, or an array of sensors, for communicating sensed information to processing device 1102. Sensed information can include voice commands, audio signals, geographic location information, and/or digital imagery, for example.

The data storage system 1140 can include a machine-readable storage medium 1142 (also known as a computer-readable medium) on which is stored one or more sets of instructions 1144 or software embodying any one or more of the methodologies or functions described herein. The instructions 1112, 1114, 1144 can also reside, completely or at least partially, within the main memory 1104 and/or within the processing device 1102 during execution thereof by the computer system 1100, the main memory 1104 and the processing device 1102 also constituting machine-readable storage media.

In one embodiment, the instructions 1112 include instructions to implement functionality corresponding to engagement feedback system 250 (e.g., the engagement feedback system 250 of FIG. 2). While the machine-readable storage medium 1142 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 200, can carry out the computer-implemented method of generating data validation assertions and verifying that data batches meet these data validation assertions, in response to its processor executing a computer program (e.g., a sequence of instructions) contained in a memory or other non-transitory computer readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method to provide engagement feedback while maintaining user privacy, the method comprising:
   creating a group identification for one or more user groups by a computer system, a user group comprising a plurality of users of an online system and a group size of the user group;
   anonymizing an identity of a user requesting content by replacing the identity with the group identification associated with the user;
   tracking a plurality of different types of user interactions with the content on the online system from a plurality of users, the plurality of user interactions comprising one or more of: clicking to see more content, clicking to like the content, responding to the content, clicking to subscribe to a content provider, or rating the content;
   collecting the plurality of different types of user interactions with the group identification;
   updating a group action count for a first group based on the plurality of user interactions, the group action count indicating a number of interactions with the piece of content by any of the plurality of users in the first group;
   calculating an estimated number of unique engagements with the piece of content via the online system based on the group action count and the group size of the first group; and
   providing the estimated number of unique engagements to the online system as the engagement feedback for the piece of content.

2. The method of claim 1, further comprising:
   calculating the estimated number of unique engagements for each of the one or more user groups;
   wherein the engagement feedback is a cumulative estimated number of unique engagements based on a sum of the calculated estimated number of unique engagements for all of the one or more user groups.

3. The method of claim 1, further comprising:
   calculating a probabilistic guarantee score of the estimated number of unique engagements; and
   providing the probabilistic guarantee score to the online system.

4. The method of claim 3, further comprising:
   in response to determining that the probabilistic guarantee score is below a threshold value, displaying, via the online system, an indicator that the estimated number of unique engagements is not available.

5. The method of claim 3, further comprising:
   receiving an adjusted group size of the user group from the online system; and
   calculating the estimated number of unique engagements and the probabilistic guarantee score based on the adjusted group size of the user group.

6. The method of claim 5, further comprising:
   enabling a content provider to set a requested accuracy level for the probabilistic guarantee score, and determine the adjusted group size based on the requested accuracy level.

7. The method of claim 1, wherein a user identity of the user that interacted with the piece of content is not available to the online system.

8. The method of claim 1, wherein the plurality of different types of user interactions further comprises one or more of: viewing the piece of content, or resharing the piece of content.

9. The method of claim 1, further comprising:
   determining that the users in the first group are differentially active;
   defining an effective group size as a fraction of the group size for the first group; and
   using the effective group size as the group size in calculating the estimated number of unique engagements for the first group.

10. The method of claim 1, wherein the estimated number of unique engagements comprises estimating a number of users that had a set number of interactions with the piece of content via the online system.

11. A method of tracking online engagements with digital content by users of an online system while maintaining user privacy, the method comprising:
    defining a plurality of user groups, a user group comprising a plurality of users of the online system, each of the plurality of user groups having a group ID;
    tracking a plurality of different types of user actions relating to the digital content on the online system from a plurality of users in a first group of the plurality of user groups, the plurality of user actions comprising one or more of: clicking to see more content, clicking to like the content, responding to the content, clicking to subscribe to a content provider, or rating the content;
    collecting the plurality of different types of user actions associated with the group ID for the user and anonymizing the user;
    updating a group action count for the first group based on the plurality of different types of user actions; and
    calculating an estimated number of unique engagements with a piece of content based on the group action count for the first group and a group size of the first group.

12. The method of claim 11, further comprising:
calculating the estimated number of unique engagements for each of the plurality of user groups; and
providing a sum of the estimated number of unique engagements from the plurality of groups to the online system.

13. The method of claim 11, further comprising:
calculating a probabilistic guarantee score of the estimated number of unique engagements; and
providing the probabilistic guarantee score to the online system.

14. The method of claim 13, further comprising:
when the probabilistic guarantee score is below a threshold, displaying an indicator that the estimated number of unique engagements is not available via the online system.

15. The method of claim 13, further comprising:
receiving an adjusted group size of the user group from the online system; and
calculating the estimated number of unique engagements and the probabilistic guarantee score based on the adjusted group size of the user group.

16. The method of claim 15, further comprising:
enabling a content provider to set a requested accuracy level for the probabilistic guarantee, and determine the adjusted group size based on the requested accuracy level.

17. The method of claim 11, wherein the plurality of different types of user actions further comprises one or more of: viewing the digital content, or resharing the digital content.

18. The method of claim 11, further comprising:
determining that the users in the first group are differentially active;
defining an effective group size as a fraction of the group size for the first group; and
using the effective group size used as the group size in calculating the estimated number of unique engagements for the first group.

19. The method of claim 11, wherein the estimated number of unique engagements comprises estimating a number of users that had a set number of interactions with the piece of content via the online system.

20. A system for tracking online engagements with digital content by users of an online system while maintaining user privacy, the system comprising:
a means for defining a plurality of user groups, a user group comprising a plurality of users of the online system;
a user interface means for tracking one of a plurality of user actions relating to the digital content on the online system from a plurality of users in a first group of the plurality of user groups, the plurality of user actions comprising one or more of: clicking to see more content, clicking to like the content, responding to the content, clicking to subscribe to a content provider, or rating the content, the indication including an identifier for the first group, and anonymizing the user;
a collecting means to collect the plurality of user actions from the plurality of users;
a means for updating a group action count for the first group based on the user action; and
a means for calculating an estimated number of unique engagements based on the group action count for the first group and a group size of the first group.

* * * * *